(12) United States Patent
Malhotra

(10) Patent No.: US 10,197,016 B2
(45) Date of Patent: Feb. 5, 2019

(54) FUEL SUPPLY SYSTEM AND VALVE ASSEMBLY THEREFOR

(71) Applicant: Progress Rail Locomotive Inc., LaGrange, IL (US)

(72) Inventor: Rakesh R. Malhotra, Aurora, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 232 days.

(21) Appl. No.: 15/372,550

(22) Filed: Dec. 8, 2016

(65) Prior Publication Data

US 2018/0163669 A1 Jun. 14, 2018

(51) Int. Cl.
| | |
|---|---|
| *F02M 21/02* | (2006.01) |
| *F16K 31/124* | (2006.01) |
| *F02D 19/02* | (2006.01) |
| *F02B 43/12* | (2006.01) |

(52) U.S. Cl.
CPC ......... *F02M 21/0293* (2013.01); *F02B 43/12* (2013.01); *F02D 19/023* (2013.01); *F02M 21/0215* (2013.01); *F02M 21/0233* (2013.01); *F02M 21/0239* (2013.01); *F02M 21/0245* (2013.01); *F16K 31/1245* (2013.01)

(58) Field of Classification Search
CPC ............. F02M 21/023; F02M 21/0239; F02M 21/0245
USPC .................................................. 123/446, 457
See application file for complete search history.

(56) References Cited

U.S. PATENT DOCUMENTS

| | | | | |
|---|---|---|---|---|
| 4,421,292 A | * | 12/1983 | Matsui | F16K 31/124 251/60 |
| 5,615,655 A | * | 4/1997 | Shimizu | F02D 37/02 123/344 |
| 5,918,618 A | | 7/1999 | Neupert | |
| 9,068,539 B2 | | 6/2015 | Coldren | |
| 2005/0241625 A1 | * | 11/2005 | Ricco | F02M 21/0239 123/527 |
| 2009/0105928 A1 | * | 4/2009 | Mueller | F01N 11/00 701/103 |
| 2015/0377184 A1 | | 12/2015 | Poapdiuc et al. | |

FOREIGN PATENT DOCUMENTS

RU 2422667 6/2011

\* cited by examiner

*Primary Examiner* — Robert K. Arundale

(57) ABSTRACT

A valve assembly of a fuel supply system includes a first body defining a first bore, an inlet port to receive fuel into the first bore, and an outlet port. The valve assembly further includes a pneumatic chamber disposed in fluid communication with the first bore. The valve assembly further includes a first piston to move between a first position and a second position. The first piston restricts and allows flow of fuel from the inlet port to the outlet port, in the first position and the second position, respectively. The valve assembly further includes a vent passage located upstream of the pneumatic chamber and configured to receive fuel leaked from a flow path defined between the inlet port and the outlet port. The valve assembly also includes a check valve disposed in the vent passage and configured to selectively vent the fuel entering the vent passage.

15 Claims, 7 Drawing Sheets

FUEL SUPPLY SYSTEM AND VALVE ASSEMBLY THEREFOR

TECHNICAL FIELD

The present disclosure relates to a fuel supply system, and more particularly to a valve assembly of the fuel supply system.

BACKGROUND

Typically, locomotive engines operate on liquid fuel, such as diesel. However, with the developments in technology, the locomotive engines are capable of operating on gaseous fuel, such as natural gas. A fuel supply system of a locomotive engine includes a valve assembly to control flow of pressurized gaseous fuel from a fuel tank to the locomotive engine. Conventionally, a pneumatic system is used to displace a valve element of the valve assembly from a rest position of the valve element. In a displaced position, the valve element allows flow of the gaseous fuel to the locomotive engine, through the valve assembly.

However, flow of the pressurized gaseous fuel poses a risk, which may affect operation of the fuel supply system. For example, the pressurized gaseous fuel may leak from an actual flow path defined within the valve assembly and enter into a chamber where air is supplied. Such leakage of the gaseous fuel into the chamber may render components of the pneumatic system non-functional, thereby affecting operation of the locomotive engine.

SUMMARY OF THE DISCLOSURE

In one aspect of the present disclosure, a valve assembly for a fuel supply system is provided. The valve assembly includes a first body defining a first bore, an inlet port, and an outlet port. The inlet port is in fluid communication with the first bore and configured to receive fuel from a fuel tank, and the outlet port is in fluid communication with the first bore and configured to supply fuel from the first bore to an engine. The valve assembly further includes a pneumatic chamber in fluid communication with the first bore of the first body. The valve assembly further includes a first piston slidably disposed in the first bore. The first piston is configured to reciprocate between a first position and a second position. The first piston restricts flow of fuel from the inlet port to the outlet port in the first position and allows flow of fuel from the inlet port to the outlet port in the second position. The valve assembly further includes a vent passage defined in the first body and located upstream of the pneumatic chamber. The vent passage is configured to receive fuel leaked from a flow path defined between the inlet port and the outlet port. The valve assembly also includes a check valve disposed in the vent passage and configured to selectively vent the fuel entering the vent passage.

In another embodiment of the present disclosure, a fuel supply system is provided. The fuel supply system includes a fuel tank and a valve assembly in fluid communication with the fuel tank. The valve assembly includes a first body defining a first bore, an inlet port, and an outlet port. The inlet port is in fluid communication with the first bore and configured to receive fuel from the fuel tank, and the outlet port is in fluid communication with the first bore and configured to supply fuel from the first bore to an engine. The valve assembly further includes a pneumatic chamber in fluid communication with the first bore of the first body. The valve assembly further includes a first piston slidably disposed in the first bore and configured to reciprocate between a first position and a second position. The first piston restricts flow of fuel from the inlet port to the outlet port in the first position and allows flow of fuel from the inlet port to the outlet port in the second position. The valve assembly further includes a vent passage defined in the first body and located upstream of the pneumatic chamber. The vent passage is configured to receive fuel leaked from a flow path defined between the inlet port and the outlet port. The valve assembly also includes a check valve disposed in the vent passage and configured to selectively vent the fuel entering the vent passage.

In yet another embodiment, a valve assembly for a fuel supply system is provided. The valve assembly includes a first body defining a first bore, an inlet port, and an outlet port. The inlet port is in fluid communication with the first bore and configured to receive fuel from a fuel tank, and the outlet port is in fluid communication with the first bore and configured to supply fuel from the first bore to an engine. The valve assembly further includes a pneumatic chamber in fluid communication with the first bore of the first body. The valve assembly further includes a first piston slidably disposed in the first bore. The first piston is configured to reciprocate between a first position and a second position. The first piston restricts flow of fuel from the inlet port to the outlet port in the first position and allows flow of fuel from the inlet port to the outlet port in the second position. The valve assembly further includes a vent passage defined in the first body and located upstream of the pneumatic chamber. The vent passage is configured to receive fuel leaked from a flow path defined between the inlet port and the outlet port. The valve assembly further includes a check valve disposed in the vent passage and configured to selectively vent the fuel entering the vent passage. The valve assembly also includes a vent pipe external to the first body and coupled to the check valve, to vent the fuel from the valve assembly.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims. No element, act, or instruction used herein should be construed as critical or essential unless explicitly described as such. Also, as used herein, the articles "a" and "an" are intended to include one or more items, and may be used interchangeably with "one or more". Furthermore, as used herein, the term "set" is intended to include one or more items, and may be used interchangeably with "one or more".

Figure 1:
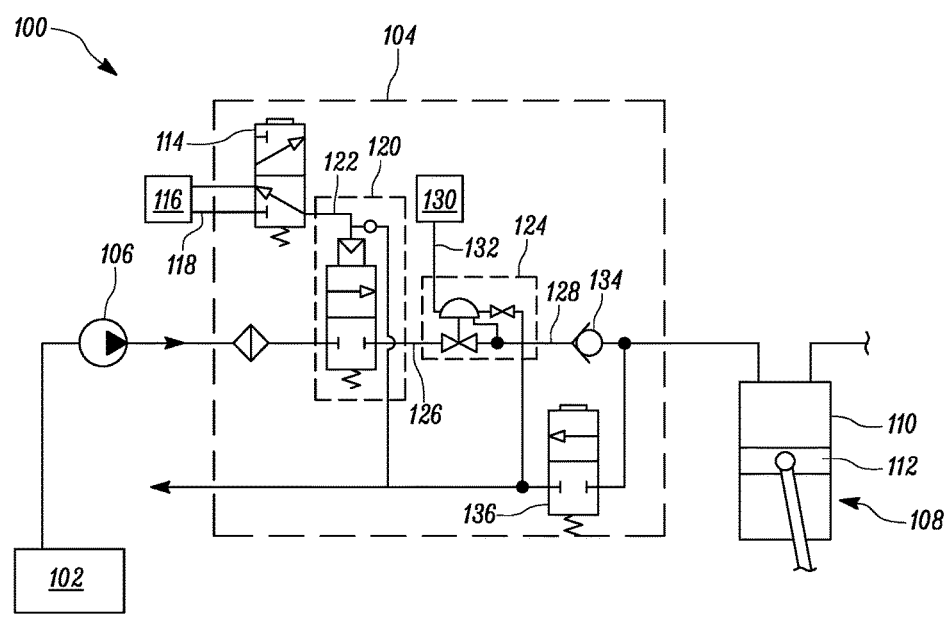
FIG. 1 is a schematic diagram of a fuel supply system for an engine, according to an embodiment of the present disclosure.

Referring to FIG. 1, a schematic diagram of a fuel supply system 100, according to an embodiment of the present disclosure, is illustrated. The fuel supply system 100 includes a fuel tank 102 for storing fuel. In an example, the fuel may be liquefied natural gas. The fuel supply system 100 further includes a fuel flow control unit 104 equipped with multiple valves for the purpose of controlling flow of the fuel. A pump 106 is disposed in fluid communication with the fuel tank 102 and the fuel flow control unit 104. The pump 106 draws fuel from the fuel tank 102, pressurizes the fuel and supplies the pressurized fuel, such as high pressure natural gas, to the fuel flow control unit 104, as shown in FIG. 1.

The fuel is then supplied from the fuel flow control unit 104 to an engine 108. In one example, the engine 108 may be a natural gas engine. However, it will be understood by a person skilled in the art that the engine 108 may be configured to operate on liquid fuel besides the natural gas. In another example, the engine 108 may be embodied as a dual fuel engine which uses liquid diesel fuel as pilot fuel and natural gas as main fuel. The engine 108 includes a cylinder 110 and a piston 112 reciprocally disposed within the cylinder 110. Although FIG. 1 illustrates a single cylinder 110, it will be appreciated that the engine 108 may include a number of cylinders disposed in an in-line configuration, a V-configuration, or in any other suitable configuration as known to a person skilled in the art.

The fuel flow control unit 104 includes a pneumatic valve 114 in fluid communication with a pneumatic system 116 via a first flow path 118. The pneumatic system 116 is equipped with pneumatic pumps and other pneumatic devices to pressurize air. The pneumatic valve 114 receives the pressurized air from the pneumatic system 116 and allows the pressurized air to flow to a valve assembly 120 of the fuel flow control unit 104, via a second flow path 122. As such, the valve assembly 120 is configured to receive the pressurized air from the pneumatic valve 114 and the pressurized fuel from the pump 106. The valve assembly 120 is disposed in fluid communication with a regulator 124 via a third flow path 126. The regulator 124 supplies the received fuel to the engine 108 via a fourth flow path 128. The regulator 124 is also in fluid communication with a fluid supply unit 130 via a fifth flow path 132. While the fuel tank 102 stores the fuel, such as the liquefied natural gas, the fluid supply unit 130 stores liquids, such as diesel fuel. The manner in which the fuel is allowed to flow through the valve assembly 120 and the regulator 124 is described in the following figures.

The fuel flow control unit 104 also includes a one-way valve 134 disposed in the fourth flow path 128 to prevent back flow of fuel to the regulator 124. Further, a return valve 136 is coupled to the fourth flow path 128 at a location downstream of the one-way valve 134. The fuel flowing towards the one-way valve 134 is vented to the atmosphere, by the return valve 136, via a separator (not shown).

Figure 2A:
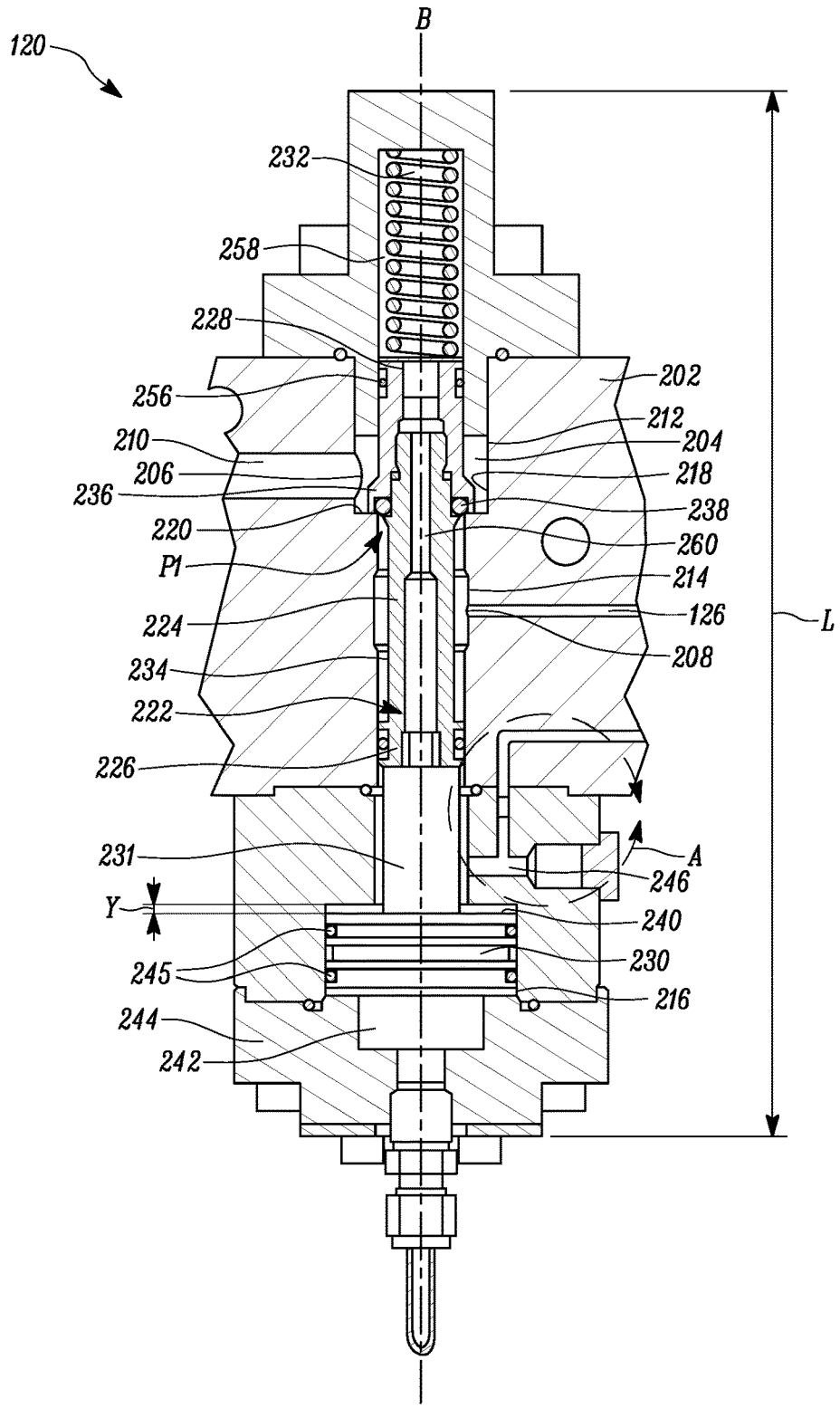
FIG. 2A is a cross-sectional view of a valve assembly of the fuel supply system of FIG. 1 showing a first position of a first piston of the valve assembly, according to an embodiment of the present disclosure.
Figure 2B:
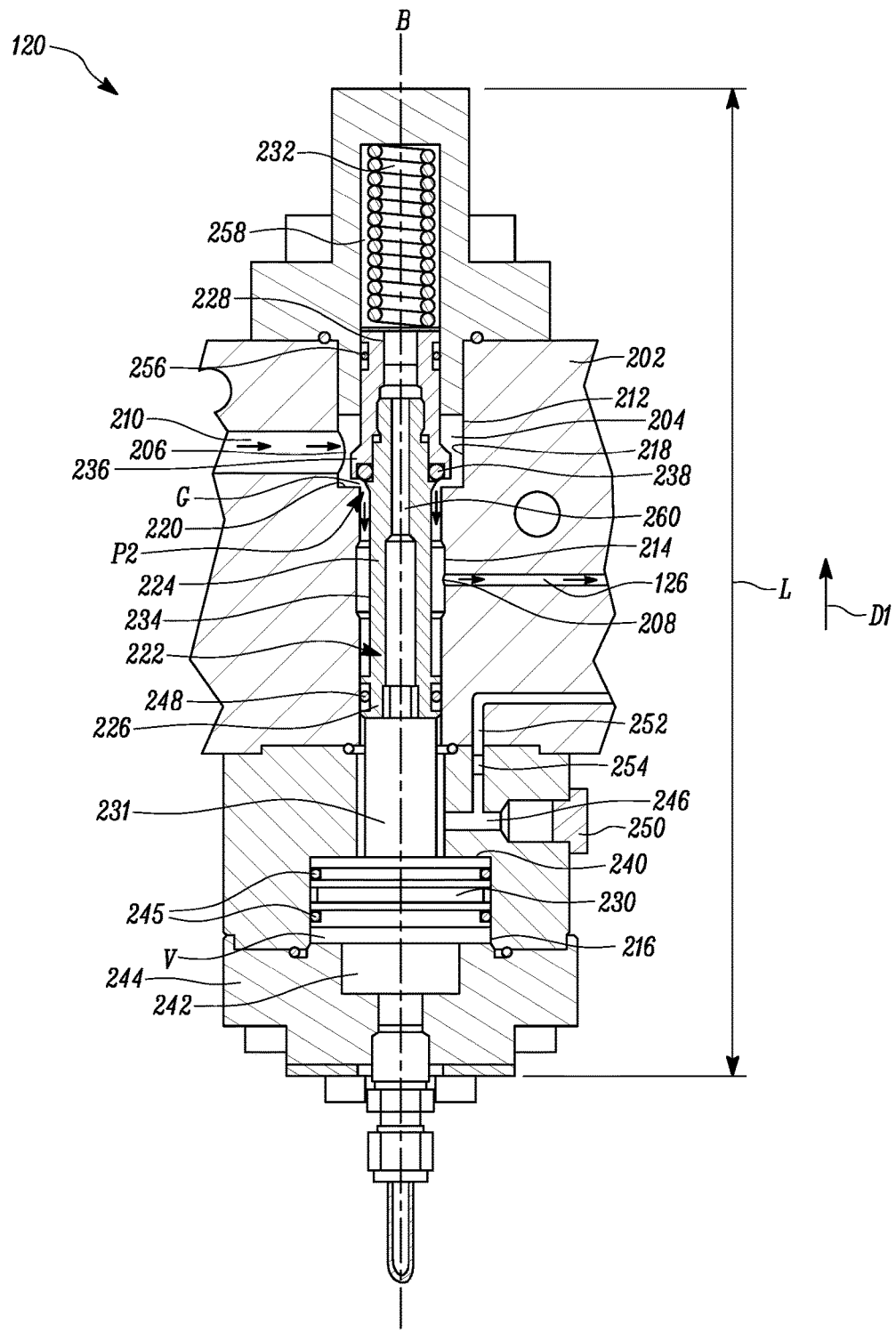
FIG. 2B is a cross-sectional view of the valve assembly showing a second position of the first piston, according to an embodiment of the present disclosure.

FIG. 2A and FIG. 2B illustrate cross-sectional views of the valve assembly 120, according to various embodiments of the present disclosure. Referring to FIG. 2A, the valve assembly 120 includes a first body 202 defining a first bore 204, an inlet port 206, and an outlet port 208. The first bore 204 extends along a length 'L' of the first body 202. The inlet port 206 is in fluid communication with the first bore 204 and an intake passage 210. The pressurized fuel from the pump 106 flows to the inlet port 206 via the intake passage 210. In an example, the fuel received at the inlet port 206 may be at a pressure of about 400 bars. Likewise, the outlet port 208 is in fluid communication with the first bore 204 and the third flow path 126, to allow supply of fuel from the first bore 204 to the engine 108. The inlet port 206 and the outlet port 208 of the valve assembly 120 define a flow path for fuel within the valve assembly 120.

In an embodiment, the first bore 204 includes a first portion 212, a second portion 214, and a third portion 216 along a longitudinal axis 'B' of the first body 202, as shown in FIG. 2A. The second portion 214 of the first bore 204 has a cross-section less than a cross-section of the first portion 212 of the first bore 204. As such, an inner surface 218 of the first bore 204 defines a seat 220 at a junction of the first portion 212 and the second portion 214. As such, the seat 220 is located in the flow path defined between the inlet port 206 and the outlet port 208. The seat 220 may be characterized by either an immediate decrease in cross-section of the inner surface 218 from the first portion 212 to the second portion 214, or a gradual decrease in cross-section of the inner surface 218 from the first portion 212 to the second portion 214. Further, the third portion 216 of the first bore 204 may have a cross-section greater than the cross-section of the second portion 214.

The valve assembly 120 further includes a first piston 222 slidably disposed in the first bore 204. The first piston 222 includes a connecting rod 224 having a first end 226 and a second end 228 distant from the first end 226. The first end 226 of the connecting rod 224 is connected to a piston head 230 via a pin 231, and the second end 228 is coupled to a first biasing member 232. The piston head 230 is disposed in the third portion 216 of the first bore 204.

In an embodiment, an outer surface 234 of the first piston 222, particularly the outer surface 234 of the connecting rod 224, defines a shoulder 236 configured to rest against the seat 220, as shown in FIG. 2A. The shoulder 236 may be characterized by a portion corresponding to that of the seat 220, so that the shoulder 236 can rest against the seat 220. For the purpose of description, this position of the first piston 222, where the shoulder 236 of the first piston 222 rests against the seat 220, is referred to as a first position 'P1' of the first piston 222. The shoulder 236 of the first piston 222 also includes a first sealing member 238. In the first position 'P1', the first piston 222, along with the aid of the first sealing member 238, restricts flow of the fuel from the inlet port 206 to the outlet port 208. Further, in the first position 'P1', a top peripheral surface 240 of the piston head 230 is disposed at a distance 'Y' from a junction defined by the second portion 214 of the first bore 204 and the third portion 216 of the first bore 204.

The valve assembly 120 further includes a pneumatic chamber 242 in fluid communication with the first bore 204. The pneumatic chamber 242 may be defined in a housing 244 and the housing 244 may be suitably coupled to the first body 202 so that the pneumatic chamber 242 is in fluid communication with the third portion 216 of the first bore 204. The pneumatic chamber 242 fluidly communicates with the pneumatic system 116 via the pneumatic valve 114. Therefore, pressurized air flows from the pneumatic system 116 to the pneumatic chamber 242. In an example, the air received into the pneumatic chamber 242 is at a pressure of about 10 bar. Multiple second sealing members 245 are disposed between a periphery of the piston head 230 and the inner surface 218 of the first bore 204 at the third portion 216. The second sealing members 245 are designed to withstand the pressure of the air supplied into the pneumatic chamber 242.

The valve assembly 120 also includes a vent passage 246 defined in the first body 202 and located upstream of the pneumatic chamber 242. In particular, the vent passage 246 is located between the outlet port 208 and the pneumatic chamber 242, and extends along width of the first body 202. The vent passage 246 is in fluid communication with the first bore 204 and configured to receive the fuel leaked from the flow path defined between the inlet port 206 and the outlet port 208.

In operation, when the engine 108 is switched on, the pneumatic system 116 supplies pressurized air into the pneumatic chamber 242, thereby pressurizing the pneumatic chamber 242. The pressurized air applies thrust on the piston head 230 and causes the first piston 222 to be displaced from the first position 'P1' to a second position 'P2', in an upward direction 'D1' as shown in FIG. 2B. When the first piston 222 is displaced in the upward direction 'D1', the top peripheral surface 240 of the piston head 230 moves by the distance 'Y' and contacts the inner surface 218 of the junction defined by the second portion 214 of the first bore 204 and the third portion 216 of the first bore 204. The connecting rod 224 is also moved by the distance 'Y' in the upward direction 'D1'. During the movement of the connecting rod 224 in the upward direction 'D1', the first biasing member 232 is compressed and the shoulder 236 is disposed above the seat 220 (as shown in FIG. 2B), thereby defining a gap 'G'.

In the second position 'P2', the first piston 222 allows flow of the fuel from the inlet port 206 to the outlet port 208. The fuel reaching the outlet port 208 flows through the third flow path 126. A third sealing member 248 is disposed between the outer surface 234 of the connecting rod 224 and the inner surface 218 of the second portion 214 of the first bore 204, upstream of the vent passage 246, to prevent the fuel from entering into an intermediate volume 'V'. The third sealing member 248 is designed to withstand the pressure of the fuel flowing through the first bore 204. However, owing to the pressure developed in the second portion 214 of the first bore 204 due to flow of the fuel from the inlet port 206 to the outlet port 208, the fuel may seep across the third sealing member 248. The fuel leaked across the third sealing member 248 is received by the vent passage 246.

A plug 250 is disposed in the vent passage 246 to restrict outflow of fuel from the vent passage 246. The fuel entering the vent passage 246 is directed into a branch passage 252 that branches from the vent passage 246. In an embodiment, the valve assembly 120 includes a check valve 254 disposed in the vent passage 246, particularly the branch passage 252, to selectively vent the fuel entering the vent passage 246.

The fuel flowing into the first bore 204 from the intake passage 210 may also seep along the outer surface 234 of the first piston 222, in the upward direction 'D1'. Owing to the pressure, the fuel may seep further across a fourth sealing member 256 (shown in FIG. 2B) and enter into a portion 258 of the first bore 204 where the first biasing member 232 is disposed. Further, the fuel may enter a drill hole 260 provided in the first piston 222 and reach the pin 231. The fuel, from the drill hole 260, entering a circumferential cavity 262 defined between the pin 231 and the inner surface 218 of the first bore 204 is also received the vent passage 246 and vented out of the valve assembly 120.

Figure 3:
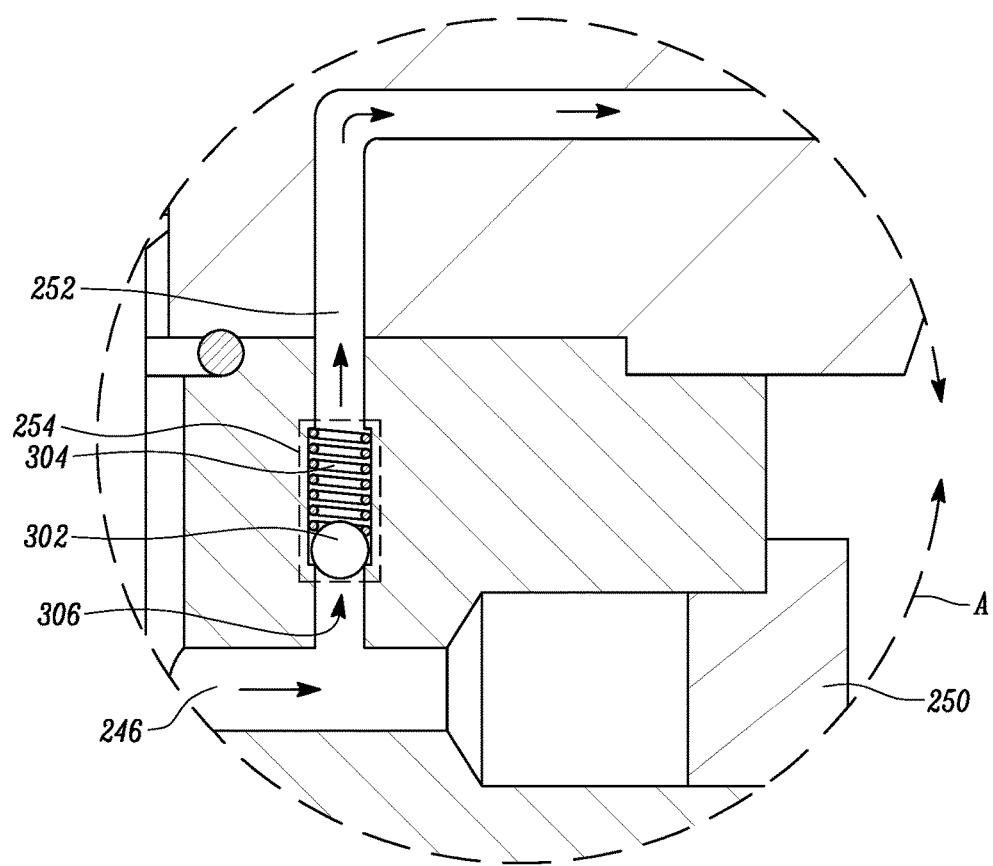
FIG. 3 is an enlarged view of a portion 'A' of the valve assembly of FIG. 2A showing location of a check valve in a vent passage, according to an embodiment of the present disclosure.

Referring to FIG. 3, an enlarged view of a portion 'A' of FIG. 2A is illustrated. In particular, the FIG. 3 illustrates the check valve 254 disposed in the vent passage 246. More particularly, the check valve 254 is disposed in the branch passage 252. The branch passage 252 is defined in the first body 202 of the valve assembly 120. The fuel entering the vent passage 246 applies thrust on a ball member 302 of the check valve 254. The ball member 302 is coupled to a second biasing member 304 of the check valve 254 and is disposed at a port 306 in the vent passage 246. A biasing force of the second biasing member 304 causes the ball member 302 to rest against the port 306, thereby rendering the port 306 closed. When the thrust corresponding to the pressure of the fuel in the branch passage 252 is greater than the biasing force of the second biasing member 304, the ball member 302 is displaced against the biasing force of the second biasing member 304, thereby rendering the port 306 open.

Figure 4:
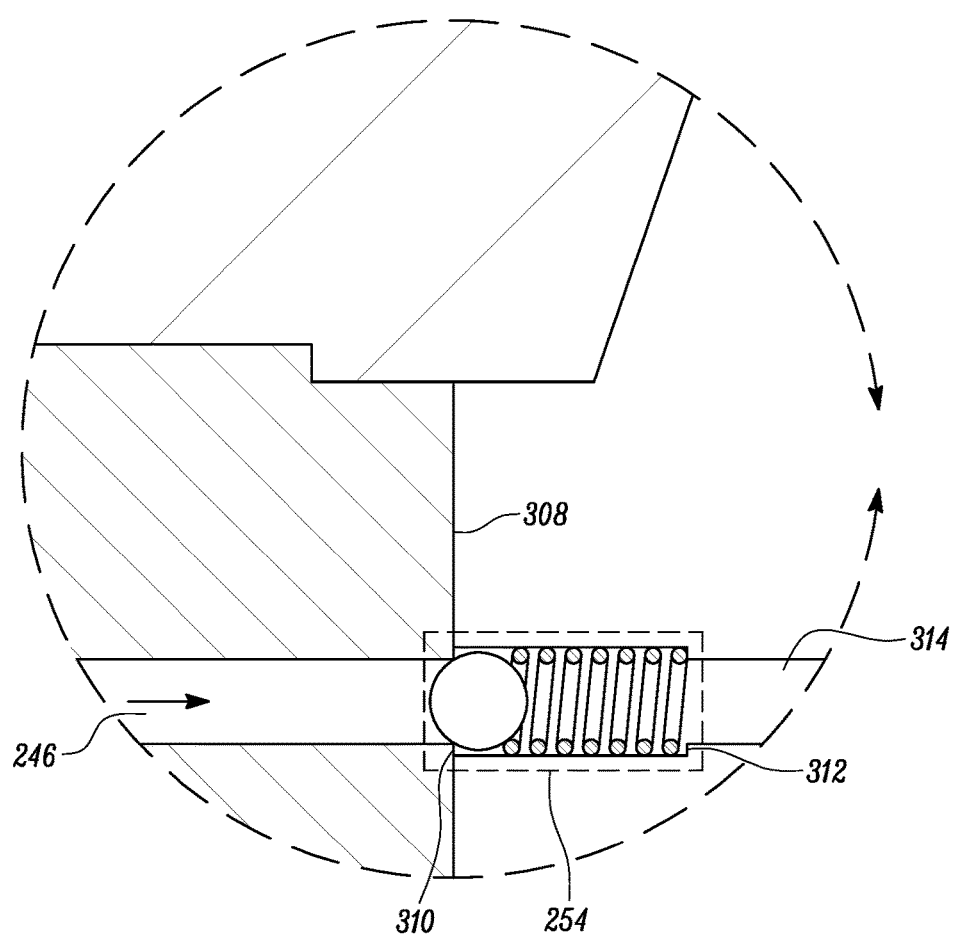
FIG. 4 is an enlarged view of a portion of the valve assembly showing location of the check valve in the vent passage, according to another embodiment of the present disclosure.

Referring to FIG. 4, the check valve 254 coupled to the vent passage 246, according to another embodiment of the present disclosure, is illustrated. Unlike the embodiment illustrated in FIG. 3, the check valve 254 is coupled to the vent passage 246, rather than being disposed in the vent passage 246. That is, the check valve 254 is coupled to one end 308 of the vent passage 246, as illustrated in FIG. 4. In such an arrangement, while a first end 310 of the check valve 254 is coupled to the vent passage 246, a second end 312 of the check valve 254 is connected to a vent pipe 314 that is external to the first body 202. That is, the vent pipe 314 may be an external pipe connected to the check valve 254 to vent the fuel from the check valve 254 to the atmosphere.

Figure 5A:
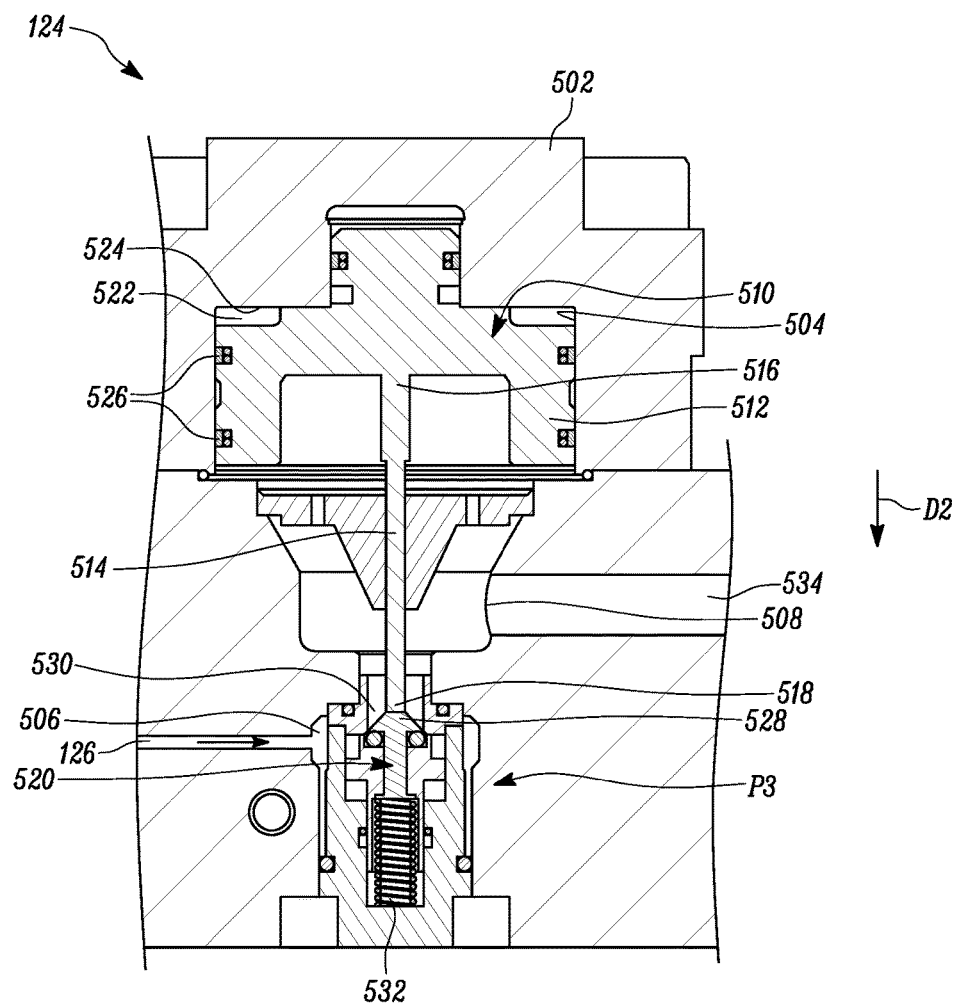
FIG. 5A is a cross-sectional view of a regulator of the fuel supply system of FIG. 1 showing a first position of a valve member of the regulator, according to an embodiment of the present disclosure.
Figure 5B:
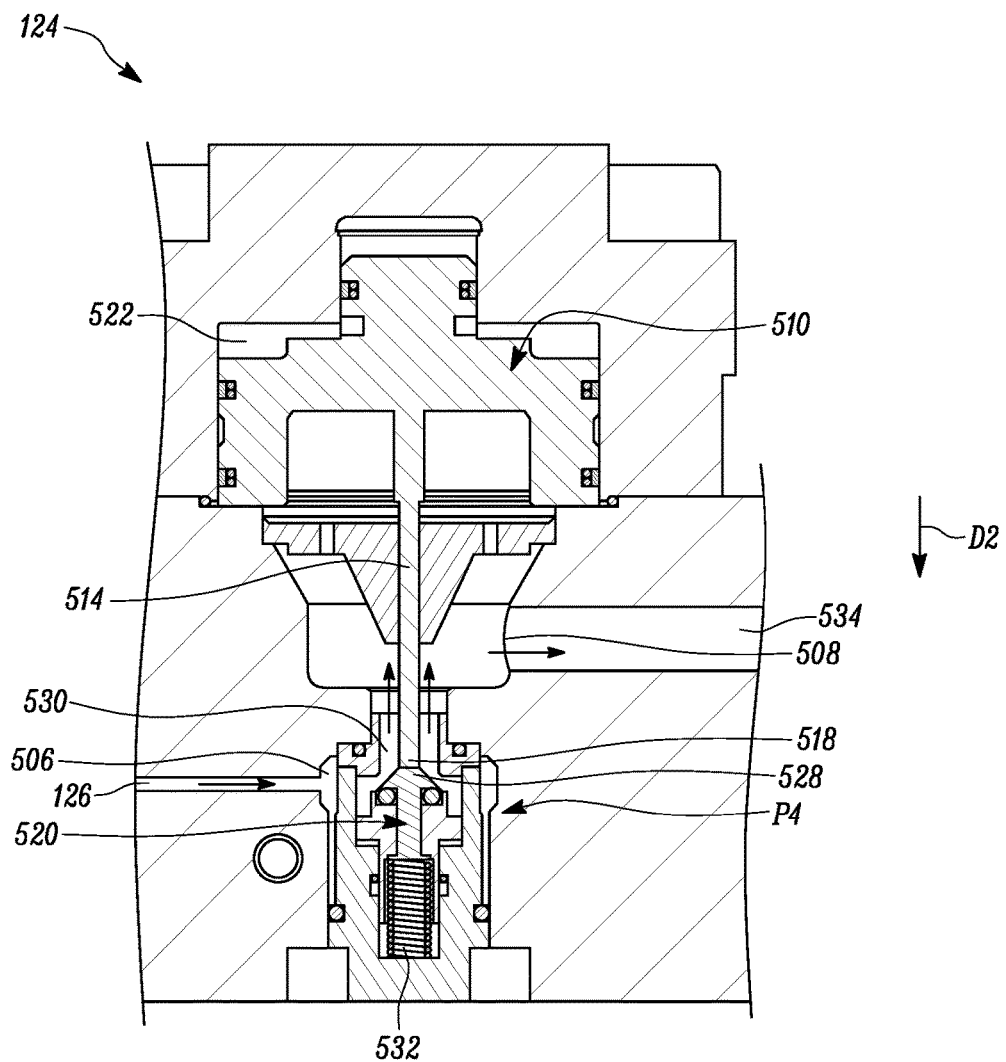
FIG. 5B is a cross-sectional view of the regulator showing a second position of the valve member, according to an embodiment of the present disclosure.

FIG. 5A and FIG. 5B illustrate schematic diagrams of the regulator 124 of the fuel supply system 100, according to various embodiments of the present disclosure. Referring to FIG. 5A, the regulator 124 includes a second body 502 and a second bore 504 defined in the second body 502. The second bore 504 defines an inlet port 506 and an outlet port 508. The inlet port 506 of the regulator 124 is in fluid communication with the outlet port 208 of the valve assembly 120 via the third flow path 126, to receive the fuel from the valve assembly 120. The outlet port 508 of the regulator 124 is in fluid communication with the second bore 504 of the regulator 124.

The regulator 124 further includes a second piston 510 slidably disposed within the second bore 504 of the regulator 124. The second piston 510 includes a piston head 512 and a connecting rod 514 extending from the piston head 512. While a first end 516 of the connecting rod 514 is connected to the piston head 512, a second end 518 of the connecting rod 514 is coupled to a valve member 520. As such, the valve member 520 is connected to the piston head 512 via the connecting rod 514. The piston head 512 is designed in a manner to define at least one fluid chamber 522 with an inner surface 524 of the second bore 504 of the regulator 124. The fluid chamber 522 is in fluid communication with the fluid supply unit 130 (as shown in FIG. 1), via the fifth flow path 132, to receive fluid at a predetermined pressure to displace the second piston 510. In an example, the fluid may be diesel fuel and the predetermined pressure may be about 400 bars. In one embodiment, the fifth flow path 132 may be embodied as a pilot flow line to supply pressurized fluid from the fluid supply unit 130 to the fluid chamber 522. The regulator 124 also includes at least one slipper seal 526 disposed between a periphery of the second piston 510 and the inner surface 524 of the second bore 504 of the regulator 124. In an example, the at least one slipper seal 526 may be made of polytetrafluoroethylene (PTFE). The at least one slipper seal 526 is designed to withstand the predetermined pressure of the fluid received in the fluid chamber 522. In the illustrated embodiment, the second piston 510 is equipped with two slipper seals 526.

Further, the valve member 520 is slidably disposed in the second bore 504 of the regulator 124, so that the valve member 520 is capable of sliding between a first position 'P3' (as shown in FIG. 5A) and a second position 'P4' (as shown in FIG. 5B). The valve member 520 is disposed in the second bore 504 against a biasing force of a third biasing member 532. In the first position 'P3', a head portion 528 of the valve member 520 rests against a port 530 defined in the second body 502 to fluidly connect the inlet port 506 and the outlet port 508. As such, the valve member 520 restricts flow of the fuel from the inlet port 506 to the outlet port 508 in the first position 'P3'.

In continuation to the operation described earlier, the fuel exiting the valve assembly 120 flows through the third flow path 126 and reaches the inlet port 506 of the regulator 124. Simultaneously, the fluid supply unit 130 supplies the fluid at the predetermined pressure to the fluid chamber 522, thereby causing application of thrust on the piston head 512 of the regulator 124 and movement of the piston head 512 in a downward direction 'D2'.

Since the connecting rod 514 is connected to the piston head 512, the connecting rod 514 also moves in the downward direction 'D2', thereby pushing the valve member 520, in the downward direction 'D2', from the first position 'P3' to the second position 'P4' (as shown in FIG. 5B). The valve member 520 allows flow of the fuel from the inlet port 506 to the outlet port 508 in the second position 'P4'. The outlet port 508 opens into the fourth flow passage 128 defined the second body 502 of the regulator 124, where the fourth flow passage 128 allows flow of the fuel to the engine 108 via the one-way valve 134. Although the description herein provides a piston arrangement for displacing the valve member 520, it should be understood that such arrangement do not limit the present disclosure. Various other arrangements and components may be deployed within the regulator 124 to selectively allow flow of the fuel from the inlet port 506 to the outlet port 508 for regulating pressure of the fuel.

Various embodiments disclosed herein are to be taken in the illustrative and explanatory sense, and should in no way be construed as limitations to the present disclosure.

INDUSTRIAL APPLICABILITY

Embodiments of the present disclosure provide the fuel supply system 100 equipped with the valve assembly 120 and the regulator 124. The fuel supply system 100 may be deployed in a locomotive to supply the fuel to engines of the locomotive. As described earlier, the vent passage 246 is located between the outlet port 208 of the valve assembly 120 and the pneumatic chamber 242. In case where the fuel leaks out of the flow path defined between the inlet port 206 and the outlet port 208, the pressure of the fuel can cause the fuel to seep through the third sealing member 248. The vent passage 246 readily vents the seeped fuel to flow out of the first body 202 of the valve assembly 120, without affecting operational pressure within the valve assembly 120. Additionally, the check valve 254 disposed in the vent passage 246, or coupled to the vent passage 246, selectively vents the fuel from the valve assembly 120 to the atmosphere. Therefore, the valve assembly 120 of the present disclosure eliminates communication between the fuel and air, thereby ensuring operational efficiency of the fuel supply system 100 and the engine 108.

Further, the fuel exiting the valve assembly 120 through the outlet port 208 enters the inlet port 506 of the regulator 124. The regulator 124 aids in regulating pressure of the fuel, so that the fuel flowing into the engine 108 is pressurized to required level only. Since the regulator 124 of the present disclosure is equipped with slipper seals 526 on the second piston 510, contact between the fluid in the fluid chamber 522 and the fuel received within the second bore 504 may be overcome. That is, the slipper seals 526 are designed to withstand operating pressures of the regulator 124, such as pressure of the fluid within the fluid chamber 522 and pressure of the fuel flowing through the second bore 504 of the regulator 124, as opposed to conventional seals of the regulator 124.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A valve assembly for a fuel supply system, the valve assembly comprising:
   a first body defining:
      a first bore;
      an inlet port in fluid communication with the first bore and configured to receive fuel from a fuel tank; and
      an outlet port in fluid communication with the first bore and configured to supply the fuel from the first bore to an engine;
   a pneumatic chamber in fluid communication with the first bore of the first body;
   a first piston slidably disposed in the first bore and configured to reciprocate between a first position and a second position, wherein the first piston restricts flow of the fuel from the inlet port to the outlet port in the first position and allows flow of the fuel from the inlet port to the outlet port in the second position;
   a vent passage defined in the first body and located upstream of the pneumatic chamber, the vent passage configured to receive the fuel leaked from a flow path defined between the inlet port and the outlet port; and
   a check valve disposed in the vent passage and configured to selectively vent the fuel entering the vent passage.

2. The valve assembly of claim 1, further comprising:
an inner surface of the first bore defining a seat, the seat being located in the flow path defined between the inlet port and the outlet port, and
an outer surface of the first piston defining a shoulder configured to rest against the seat in the first position of the first piston.

3. The valve assembly of claim 1, wherein the first piston comprises a connecting rod having a first end and a second end, the first end is connected to a piston head disposed in the pneumatic chamber and the second end, distant from the first end, is coupled to a first biasing member.

4. The valve assembly of claim 3, wherein the first body of the valve assembly is coupled to a pneumatic system configured to supply air into the pneumatic chamber for displacing the first piston from the first position to the second position.

5. The valve assembly of claim 4, wherein the air is pressurized to about 10 bars.

6. The valve assembly of claim 1, wherein the vent passage is open to atmosphere.

7. The valve assembly of claim 1, wherein the fuel is natural gas.

8. The valve assembly of claim 1, wherein the fuel received at the inlet port of the valve assembly is at a pressure of about 500 bars.

9. A fuel supply system comprising:
a fuel tank; and
a valve assembly in fluid communication with the fuel tank, the valve assembly comprising:
a first body defining:
a first bore;
an inlet port in fluid communication with the first bore and configured to receive the fuel from the fuel tank;
an outlet port in fluid communication with the first bore and configured to supply the fuel from the first bore to an engine; and
a pneumatic chamber in fluid communication with the first bore of the first body;
a first piston slidably disposed in the first bore and configured to reciprocate between a first position and a second position, wherein the first piston restricts flow of the fuel from the inlet port to the outlet port in the first position and allows flow of the fuel from the inlet port to the outlet port in the second position;
a vent passage defined in the first body and located upstream of the pneumatic chamber, the vent passage configured to receive the fuel leaked from a flow path defined between the inlet port and the outlet port; and
a check valve disposed in the vent passage and configured to selectively vent the fuel entering the vent passage.

10. The fuel supply system of claim 9, wherein the first piston comprises a connecting rod having a first end and a second end, the first end is connected to a piston head disposed in the pneumatic chamber and the second end, distant from the first end, is coupled to a first biasing member.

11. The fuel supply system of claim 10 further comprising a pneumatic system coupled to the first body and configured to supply air into the pneumatic chamber for displacing the first piston from the first position to the second position.

12. The fuel supply system of claim 11 further comprising a regulator coupled to the valve assembly, the regulator comprising:
a second bore defining:
an inlet port in fluid communication with the outlet port of the valve assembly to receive the fuel from the valve assembly; and
an outlet port in fluid communication with the second bore of the regulator and the engine;
a second piston slidably disposed within the second bore of the regulator, the second piston defining at least one fluid chamber with an inner surface of the second bore of the regulator, the at least one fluid chamber configured to receive fluid at a predetermined pressure to displace the second piston; and
at least one slipper seal disposed between a periphery of the second piston and the inner surface of the second bore of the regulator.

13. The fuel supply system of claim 12, wherein the regulator further comprises a valve member connected to the second piston via a connecting rod, the valve member slidably disposed in the second bore and configured to reciprocate between a first position and a second position based on the displacement of the second piston, and wherein the valve member restricts flow of the fuel from the inlet port of the regulator to the outlet port of the regulator in the first position and allows flow of the fuel from the inlet port of the regulator to the outlet port of the regulator in the second position.

14. The fuel supply system of claim 13, wherein the predetermined pressure is about 400 bars.

15. A valve assembly for a fuel supply system, the valve assembly comprising:
a first body defining:
a first bore;
an inlet port in fluid communication with the first bore and configured to receive fuel from a fuel tank; and
an outlet port in fluid communication with the first bore and configured to supply the fuel from the first bore to an engine;
a pneumatic chamber in fluid communication with the first bore of the first body;
a first piston slidably disposed in the first bore and configured to reciprocate between a first position and a second position, wherein the first piston restricts flow of the fuel from the inlet port to the outlet port in the first position and allows flow of the fuel from the inlet port to the outlet port in the second position;
a vent passage defined in the first body and located upstream of the pneumatic chamber, the vent passage configured to receive the fuel leaked from a flow path defined between the inlet port and the outlet port;
a check valve coupled to the vent passage and configured to selectively vent the fuel entering the vent passage; and
a vent pipe external to first body and coupled to the check valve, to vent the fuel from the valve assembly.

* * * * *